Figure 1:
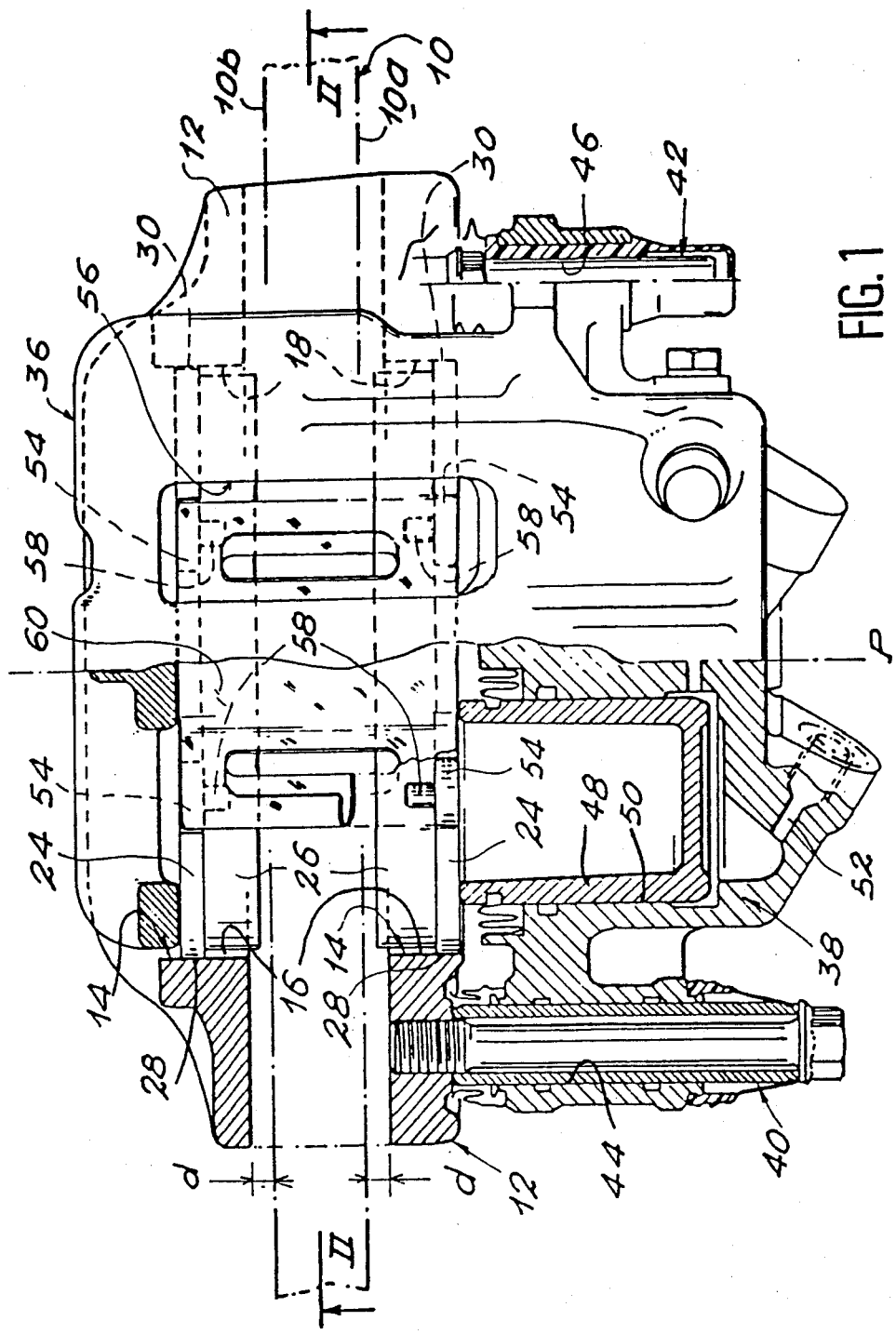

United States Patent [19]

Le Deit

[11] Patent Number: 4,890,698
[45] Date of Patent: Jan. 2, 1990

[54] DISK BRAKE AND BRAKE PAD UTILIZABLE IN SUCH A BRAKE

[75] Inventor: Gérard Le Deit, Courtry, France

[73] Assignee: Bendix France, Drancy, France

[21] Appl. No.: 294,237

[22] Filed: Jan. 9, 1989

[30] Foreign Application Priority Data

Feb. 5, 1988 [FR] France ............................ 88 01332
Nov. 25, 1988 [FR] France ............................ 88 15403

[51] Int. Cl.$^4$ ............................................ F16D 66/02
[52] U.S. Cl. ............................................... 188/1.11
[58] Field of Search ................ 188/1.11, 73.1, 250 B, 188/250 G

[56] References Cited

FOREIGN PATENT DOCUMENTS

| | | |
|---|---|---|
| 0072192 | 2/1983 | European Pat. Off. . |
| 2832443 | 2/1979 | Fed. Rep. of Germany . |
| 2904436 | 8/1980 | Fed. Rep. of Germany ..... 188/1.11 |
| 2317560 | 2/1977 | France . |
| 2415232 | 8/1979 | France . |
| 0023875 | 2/1979 | Japan .................................. 188/1.11 |

Primary Examiner—Duane A. Reger
Attorney, Agent, or Firm—Larry J. Palguta; Ken C. Decker

[57] ABSTRACT

In a disc brake having brake pads (22) accommodated inside openings (14) formed in a support member (12), the external edge (34) of the lining carrier plate (24) of each pad has at least one projecting part (54) accommodated inside an aperture (56) formed in a caliper (36) straddling the disc (10). A stud (58) made of a wear-resistant material projects from each part (54) toward the disc. Thus, in the event of the pad (22) slipping between the support member (12) and the disc (10) when the friction lining (26) is totally worn and the disc is worn, the projecting part (54) bears against the edge of the aperture (56), creating a torque which brings a stud (58) into contact with the peripheral edge (10c) of the disc. The pad is thus prevented from escaping, the driver of the vehicle is alerted by the noise resulting from contact between the stud (58) and the disc (10), the loss of efficiency of the brake is partially compensated, and the disc (20) is irreversibly damaged so that it is necessary to change it at the same time as the pads (22).

6 Claims, 2 Drawing Sheets

DISK BRAKE AND BRAKE PAD UTILIZABLE IN SUCH A BRAKE

The invention relates to a disk brake intended to equip a motor vehicle, as well as a brake pad utilizable in such a brake.

A disk brake comprises in a known manner a caliper straddling a brake disk, as well as clamping means associated with the caliper so as to move at least two brake pads towards the opposing faces of the disk.

In a first type of disk brake, known as a disk brake with a fixed caliper, the caliper is mounted directly on a non-rotating part of the vehicle and independent clamping means act on the brake pads situated on either side of the disk.

On the other hand, in disk brakes known as disk brakes with sliding calipers, the caliper is mounted on a support fixed to a non-rotating part of the vehicle, via guiding means which allow this caliper to move in a direction parallel to the axis of the disk. The clamping means therefore act directly on one of the pads so as to press it against the corresponding face of the disk. The pad situated on the other side is pressed against the other face of the disk indirectly as a result of the caliper sliding on the fixed support.

The invention, which is applicable to either of these two types of disk brake, relates more specifically to the case where the pads are accommodated inside openings formed in a support member. In the case of a brake with a fixed caliper, this support member is the caliper. On the other hand, in the case of a brake with a sliding caliper, the support member inside which the pads are accommodated may be equally well either the caliper or, preferably, the fixed support on which the caliper slides.

In disk brakes designed in this manner, the braking torque produced by the friction linings of the pads coming into contact against the rotating disk is transmitted directly from the pads to the support member as a result of the pads bearing against anchoring surfaces formed on this member.

Taking into account in particular the manufacturing and assembly tolerances, a certain gap necessarily exists between the rotating disk and the parts of the support member in which the anchoring surfaces serving as a support for the pads during braking are formed.

This gap increases regularly with wear of the disk. When it is greater than the thickness of the lining carrier plate of the pads, the braking system is regarded as being dangerous since the pads, after a certain degree of wear of the friction linings, may slip into this gap, thereby resulting in the total loss of braking action on the wheel in question, as well as an increase in the travel of the brake pedal, which may cause a total brake failure of the whole vehicle. Consequently, it is necessary to alert the driver of the vehicle as to this condition and oblige him to change the disk at the same time as the worn pads.

The invention relates specifically to a brake of this type which, as a result of its original design, is able not only to eliminate entirely the risk of the pads escaping, but also to alert the driver of the vehicle as to the degree of wear of the disk, and damage the latter irreversibly so that it is necessary to change it. The brake according to the invention is also able to compensate partially for the loss of efficiency due to wear of the friction linings.

The invention also relates to a brake pad, the particular structure of which enables it to be used advantageously in such a disk brake.

The invention applies, therefore, to a disk brake comprising a caliper straddling a brake disk and equipped with clamping means designed to move at least two brake pads towards the opposing faces of the disk, each pad being accommodated and anchored inside an opening formed in a support member and consisting of a lining carrier plate and a friction lining.

In a manner known for example from the document US-A-4,241,327, the lining carrier plate has at least one part projecting radially beyond the peripheral edge of the disk and having mounted on it at least one stud projecting axially towards the disk beyond the peripheral edge of the latter.

According to the invention, the part projecting radially from the lining carrier plate penetrates, with a given circumferential play, inside an aperture formed in the caliper for this purpose, and the stud is made of a wear-resistant material, such as hardened steel.

Preferably, each lining carrier plate has two projecting parts arranged symmetrically in relation to a center plane of the brake containing the axis of the disk, each projecting part having a stud mounted on it, and the caliper has two corresponding apertures.

Owing to the features thus defined, when the disk is worn and the friction lining of one of the pads is also worn, if the lining carrier plate of this pad starts to slip between the support member and the disk and escapes from the opening formed for this purpose in the support member, the play which existed originally between the projecting part of the pad and the edge of the aperture formed in the caliper is immediately taken up. The projecting part of the pad thus bears against the edge of this aperture and the pad is prevented from escaping.

Moreover, since the point where the projecting part of the pad bears against the edge of the aperture formed in the caliper is radially offset towards the outside in relation to the center of action of the pad on the disk, a pad tilting torque is generated. This torque tends to press the stud mounted on the projecting part of the pad against the peripheral edge of the disk. The friction between this stud and the disk produces a loud noise which has the effect of immediately and effectively warning the vehicle driver of this condition. Moreover, bearing of the stud against the peripheral edge of the disk causes additional friction which partially compensates for the loss of efficiency of the brake resulting from wear of the friction linings.

Finally, the stud bites into the peripheral edge of the disk and reduces its radius so that it must be changed at the same time as the worn pads.

The invention obviously relates to the corresponding brake pad.

Figure 2:
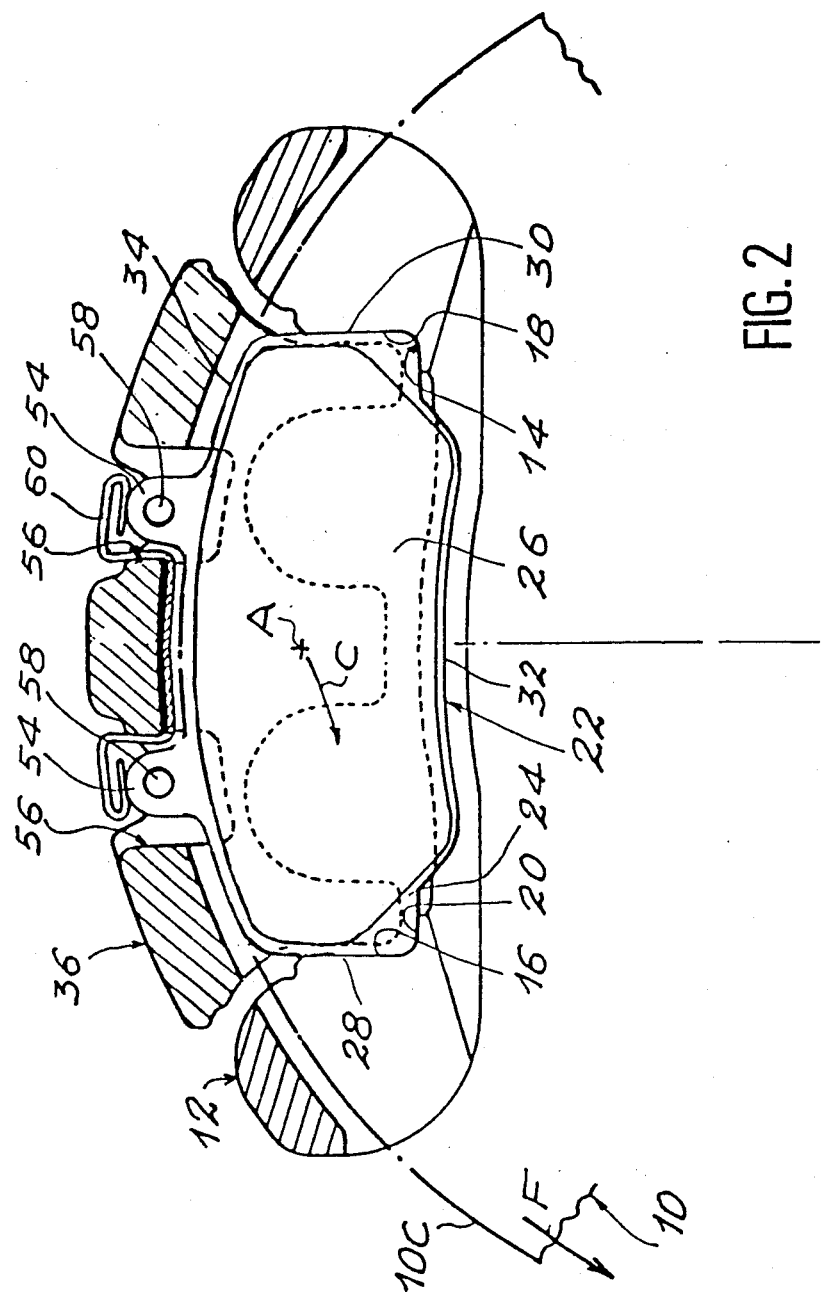

A preferred embodiment of the invention will now be described, by way of a non-limiting example, with reference to the accompanying drawings in which:

FIG. 1 is a partially sectioned plan view of a disk brake constructed in accordance with the invention; and FIG. 2 is a side view, sectioned along the line II—II of FIG. 1.

The disk brake shown by way of example (FIGS. 1 and 2) is a brake with a sliding caliper. This brake comprises a brake disk 10, shown in dot-dash lines so as not to overcomplicate the Figures, intended to be fixed onto a part rotating with the wheel of the vehicle, such as a wheel hub. This disk 10 has two parallel and opposite flat faces 10a and 10b, perpendicular to its axis, and a peripheral edge 10c.

The disk brake shown (FIGS. 1 and 2) comprises moreover a support member 12 intended to be fixed to a non-rotating part of the vehicle, adjacent to the disk 10. The support member 12 straddles the disk 10 at two locations circumferentially separated in relation to the latter (FIG. 2) and it has two approximately flat side parts situated opposite each of the faces 10a and 10b of the disk and separated from these faces by a certain distance d (FIG. 1).

An opening, indicated generally by the reference number 14, is formed in each of these two side parts of the support member 12. The openings 14 have an approximately rectangular configuration and open out in the region of the peripheral edge 10c of the disk, as shown in FIG. 2. Each of the openings 14 thus defines two parallel and opposite anchoring surfaces 16 and 18 and a supporting surface 20, which may be limited to two zones adjacent to the surfaces 16 and 18.

A brake pad, indicated generally by the reference number 22, is accommodated inside each of the openings 14. Each of these brake pads comprises in a known manner a lining carrier plate 24 and a friction lining 26 fixed onto the lining carrier plate, on the same side as the disk 10.

The lining carrier plate 24 of each of the pads has two opposing anchoring edges 28, 30 which are anchored so as to bear against the anchoring surfaces 16, 18 of the corresponding openings, in the direction of rotation of the disk 10. The anchoring edges 28, 30 formed on the lining carrier plate of each of the pads 22 are linked by a lower connecting edge 32 and by an upper connecting edge 34. Each of the pads 22 rests on the supporting surface 20 of the opening 14 inside which it is accommodated by its lower connecting edge 32, as shown in FIG. 2.

In addition to the disk 10, the support member 12 and the brake pads 22, the disk brake shown comprises a caliper 36 which straddles the disk 10 so as to be able to press the friction linings 26 of the brake pads 22 against the corresponding faces of the disk when the clamping means 38 supported by this caliper are actuated.

More precisely, the caliper 36 is supported by the support member 12, via guiding means which allow the caliper to be moved in a direction parallel to the axis of the disk. In the example of embodiment shown, these guiding means comprise two small columns 40 and 42, circumferentially located at a distance from each other and fixed by any suitable method such as screwing onto the side part of the support member 12 by means of which the latter is fixed onto a stationary part of the vehicle. The small columns 40 and 42 are directed parallel to the axis of the disk and away from the latter, so as to penetrate inside the corresponding bores 44 and 46 formed in the caliper 36.

In its part situated on the same side as the bores 44 and 46, the caliper 36 has in addition at least one hydraulic brake motor (two in FIG. 1) constituting the clamping means 38 in the example shown. Each of the brake motors consists, in a known manner, of a piston 48 sealably and slideably mounted inside a blind bore 50 formed in the caliper and opening on the same side as the disk 10, the common axes of the pistons and bores being parallel to the axis of the disk. The pistons 48 bear against the lining carrier plate 24 of the brake pad 22 located opposite the face 10a of the disk.

A pressurized brake fluid injected through the ducts 52 formed in the caliper allows the pistons 48 to be moved towards the face 10a of the disk 10. This movement of the pistons 48 towards the disk has the effect of pressing the friction lining 26 of the corresponding pad 22 against the face 10a of the disk 10. By way of reaction, the caliper 36 moves in the opposite direction to the piston 48 on the small columns 40 and 42. Since the caliper 36 bears, on the other side of the disk, against the rear face of the lining carrier plate 24 of the second pad 22, this movement of the caliper 36 causes the friction lining 26 of this second pad to be pressed as well against the face 10b of the disk. A braking action is thus obtained, in a manner per se conventional in disk brakes with a sliding caliper.

As already mentioned, after the disk is worn, when at least one of the friction linings 26 provided on the pads 22 is totally worn, the play d existing between the support member 12 and the opposing faces of the disk 10 is such that the lining carrier plate 24 of the corresponding pad may slip between the disk and the support member.

In order to eliminate this danger, in a known manner the upper connecting edge 34 of the lining carrier plate 24 of each pad comprises at least one part projecting radially outwards beyond the peripheral edge 10c of the disk, this part having mounted on it a stud 58 projecting axially towards the disk 10 beyond the peripheral edge 10c of the latter.

In the example shown in the Figures, each pad has two ear-shaped projecting parts 54 penetrating inside two corresponding apertures 56 formed in the part of the caliper 36 straddling the disk. More precisely, each of the apertures 56 of the caliper accommodates, with a given circumferential play, a projecting part 54 of each of the brake pads. The apertures 56, when viewed from above, have an approximately rectangular shape, as shown in the right-hand part of FIG. 1.

Preferably, the two brake pads are identical. Each of the pads 22 is therefore perfectly symmetrical in relation to a center plane P (FIG. 1) of this pad, directed parallel to the anchoring edges 28 and 30 of the said pad. In particular, the projecting parts 54 of each of the pads 22 are arranged symmetrically in relation to this center plane P. Correspondingly, the two apertures 56 formed in the caliper 36 are also arranged symmetrically in relation to a center plane of the brake containing the axis of the disk and merging with the center plane P of each of the pads 22, when the latter are mounted in the brake.

The studs are made of a wear-resistant material, such as hardened steel, so as to be able to damage the disk sufficiently and withstand a significant braking torque applied a given number of times. In such an example of embodiment, punch-hardened type 35NCD4 steel has been used.

The length of each of the studs 58 is less than half the thickness considered dangerous for the disk.

In a manner known per se, an elastic means consisting, in the embodiment shown, of a leaf spring 60, bears upon the caliper 36 and the upper connecting edge 34 of each of the pads 22, so as to press permanently the lower connecting edge 32 of each of the pads against the supporting surface 20 of the corresponding opening 14 formed in the support member 12. This spring 60 may in particular make contact beneath the part of the caliper 36 straddling the disk and situated between the apertures 56, and against each of the projecting parts 54 of the pads 22, as shown in the Figures.

When the disk 10 is worn and the friction lining 26 of at least one of the pads is also worn, the width d of the gap formed between each of the faces 10a and 10b of the disk and the adjacent side parts of the support member 12 is such that the lining carrier plate 24 of this pad may escape from the corresponding opening 14 and tend to slip into this gap.

In accordance with the invention, when this occurs, the circumferential play existing initially between the projecting part 54 of this pad situated towards the front when considering the direction of rotation F of the disk 10 (FIG. 2) and the edge of the aperture 56 formed in the caliper causes the pads 22 to bear against the edge of the corresponding aperture 56 closest to the front of the brake. The pad is thus prevented from slipping between the disk and the support member.

Moreover, the projecting part 54 situated towards the front of the pad bears against the edge of the corresponding aperture 56 at a point which is radially offset towards the outside in relation to the center of action A of the pad on the disk, this center of action being located approximately in the center of the friction lining 26 of this pad. This creates a torque C tending to make the pad 22 pivot about the point where the part 54 bears against the edge of the opening 56 which is nearest to the front of the brake, when the disk 10 rotates in the direction of the arrow F shown in FIG. 2. This torque C tends to make the pad 22 pivot so as to bring the stud 58, mounted on the projecting parts 54 situated at the rear of the pad 22 in relation to the direction of rotation F of the disk, into contact with the peripheral edge 10c of the disk 10.

The first consequence of the stud 58 coming into contact against the peripheral edge 10c of the disk is to produce a characteristic noise which immediately warns the vehicle driver of this situation. Moreover, the frictional contact between the stud 58 and the peripheral edge 10c of the disk partially compensates for the loss of efficiency of the brake resulting from wear of the friction linings.

Finally, the stud bits into the peripheral edge of the disk sufficiently to damage the latter irreversibly.

Of course, the invention is not limited to the embodiment described above by way of example, but covers all the variations thereof.

Therefore, although the example described concerns a disk brake with a sliding caliper, the invention also applies to a disk brake with a fixed caliper in which the caliper and the support member are constructed as one piece, the clamping means in this case having brake motors arranged on either side of the disk.

Moreover, instead of comprising two ear-shaped projecting parts, each pad may comprise only a single projecting part which is longer and, depending on the circumstances, has one or two studs mounted on it. In this case, the caliper also has a single aperture in its part situated above the disk, the projecting part of each pad being accommodated with a given circumferential play inside this aperture.

It should be noted that the brake pad described above can advantageously be used as a replacement pad and that such a pad is not required when the brake is initially mounted on the vehicle since, in this case, the disk is new. In fact, said disk wears less rapidly than the friction linings and the pads will have to be replaced at least once before the abovementioned danger arises. However, the brake caliper must still have the apertures described.

What I claim is:

1. A disc brake comprising a caliper straddling a brake disc and equipped with clamping means designed to move at least two brake pads toward opposing faces of the disc, each pad being accommodated and anchored inside an opening formed in a support member and consisting of a lining carrier plate and a friction lining, said lining carrier plate having at least one part projecting radially beyond a peripheral edge of the disc and having mounted on the plate at least one stud made of a wear-resistant material projecting axially toward said disc and beyond a peripheral edge of the disc, said radially projecting part penetrating, with a given circumferentially play, inside an aperture formed in said caliper, the support member and each side of the disc defining predetermined gaps therebetween so that when the disc and at least one friction lining of a respective brake pad are worn the respective radially projecting part engages during braking the perimeter of the aperture in the caliper as a result of the respective brake pad rotating, and the respective stud engaging and irreversibly damaging the disc when both the disc and one friction lining are worn.

2. The disc brake according to claim 1, wherein said wear-resistant material is hardened steel.

3. The disc brake according to claim 1, wherein said lining carrier plate has two radially projecting parts arranged symmetrically in relation to a center plane of the brake containing the axis of the disc, each projecting part having a stud mounted thereon, said caliper having two corresponding apertures, and one of said studs moving rotatably inwardly to engage the disc.

4. A brake pad to be accommodated and anchored inside an opening formed in a support member for said pad provided in a disc brake comprising a caliper straddling a brake disc and equipped with clamping means designed to move at least two pads toward opposing faces of the disc, said brake pad consisting of a lining carrier plate and a friction lining, said lining carrier plate having at least one part projecting radially beyond a peripheral edge of the disc and having mounted on the plate at least one stud made of wear-resistant material projecting axially toward said disc and beyond a peripheral edge of the disc, said radially projecting part penetrating, with a given circumferential play, inside an aperture formed in said caliper, the support member and each side of the disc defining predetermined gaps therebetween so that when the disc and the friction lining of the brake pad are worn the radially projecting part engages during braking the perimeter of the aperture in the caliper as a result of the brake pad rotating, and the stud engaging and irreversibly damaging the disc when both the disc and the friction lining are worn.

5. The brake pad according to claim 4, wherein said wear-resistant material is hardened steel.

6. The brake pad according to claim 4, wherein the lining carrier plate has two radially projecting parts arranged symmetrically in relation to a center plane of the brake containing the axis of the disc, each projecting part having a stud mounted thereon.

* * * * *